United States Patent Office 3,413,081
Patented Nov. 26, 1968

3,413,081
PROCESS FOR RETARDING THE EVAPORATION OF ORGANIC LIQUIDS
Werner Wolff, Neuotting (Inn), and Guido von Rosenberg and Hans Lambert, Gersthofen, near Augsburg, Germany, assignors to Farbwerke Hoechst Aktiengesellschaft vormals Meister Lucius & Bruning, Frankfurt am Main, Germany, a corporation of Germany
No Drawing. Filed Sept. 16, 1963, Ser. No. 309,916
Claims priority, application Germany, Sept. 19, 1962, F 37,841
4 Claims. (Cl. 21—60.5)

ABSTRACT OF THE DISCLOSURE

Volatilization of organic solvents in solutions or pastes is retarded by adding about 0.1% to about 10% by weight, referred to the solvent, of a partial ester of a polyhydric ether alcohol with a monobasic fatty acid or hydroxy fatty acid. Said esters may be condensed with polybasic acids or the anhydrides thereof.

A criterion for the selection of an organic solvent is the boiling point of the liquid. Usually, one will choose a liquid which has a boiling point which permits the liquid to rapidly evaporate from the solution for which it has been used, after application of the solution onto a surface, and to leave behind in a uniform coherent layer the solid substances which have also been dissolved in the solution. The relatively high volatility of such solvents, however poses disadvantages in that the solvents evaporate during storage, causing loss, and, furthermore solutions prepared with such solvents tend to thicken and dry. This gradual change of the concentration makes their application increasingly difficult.

This is the case, for example, with cleansing pastes filled in tubes. If the content of such a tube is not rapidly consumed, it becomes hard and crumbly and can no more be used.

It is an object, therefore, to find means for retarding the evaporation of the solvents in an appropriate manner.

One method used hitherto involves storing and shipping the solvents or the systems of solvents in carefully closed containers which were opened only shortly for withdrawal and which were then closed. Obviously, this method is unsatisfactory or, at least, in very many cases unsatisfactory, as is also proved by the experiences made with the said cleansing paste in tubes.

It would also be possible to cover the surface of a solvent or solvent system in a container with a protective layer impermeable to the contents, such as utilized with Greek wines which are covered with a resin layer within the bottle. When the contents of the container as described are withdrawn continually, however, it is not always possible to restore a coherent protective layer so that evaporation is not prevented. Furthermore, such a protective layer is, in effect, a contaminant of the solvent or of the system of solvents, because it cannot be removed completely before use. As such, it may then have a deteriorating effect.

The present invention provides a process for retarding the evaporation of solvents by the addition of small amounts of an evaporation-inhibiting substance which dissolves in the solvent or mixture of solvents to be protected. The additives found useful for this purpose are partial esters of polyhydric ether alcohols containing free hydroxyl groups with higher monobasic fatty acids and/or higher hydroxy fatty acids. In a variant of the process of the present invention such partial esters of the above-mentioned type are used which are modified by poly-basic acids or their anhydrides incorporated by condensation.

As monobasic acid components, there may be used straight chain or branched chain fatty acids having 8 to 28, preferably 12 to 18, carbon atoms. These acids may be saturated or unsaturated acids. They may also contain hydroxyl groups. There may be mentioned, for example, the acid mixtures of coconut oil, palmitic acid, stearic acid, montanic acid, oxystearic acid, oleic acid, linoleic acid and linolenic acid.

As polyhydric ether alcohols, there may be used, in particular, anhydro-sugar alcohols such as sorbitane and mannitane, dipentaerythritol, anhydrotrimethylolethane, anhydrotrimethylolpropane, diglycerin and polyglycerins. Equivalents of these ether alcohols within the scope of the present invention are polyhydric alcohol, for example, pentaerythritol, so far as their partial esters with the acid components of the invention are still sufficiently soluble in the solvent or solvent mixture to be protected against evaporation.

The partial esters used according to the present invention as evaporation inhibitors are prepared by known methods, for example, by interchange of ester radicals of technical fat, for example, stearin, with polyhydric ether alcohols of the mentioned type. These processes of manufacture are not an object of the present invention. The last-mentioned method of preparation yields inhibitors which contain a certain proportion of a glycerin ester that modifies their effect in the sense of the invention, but does not disturb it. Consequently, the evaporation inhibitors of the present invention can be used in admixture with determined amounts of neutral fatty acid esters.

As to a variant of the process of the present invention, partial esters of the above-mentioned type may be modified by polybasic acids or their anhydrides incorporated by condensation. As such polybasic acids, there may be used, for example, phthalic acid, isophthalic acid, terephthalic acid, tetrahydrophthalic acid, succinic acid, adipic acid, sebacic acid, and on principle all other acid components known in the chemistry of alkyd resins and polyesters and polyamides. Particularly suitable for this purpose is phthalic acid anhydride which is also technically well accessible. The corresponding oxy-acids and tribasic acids may also be used.

According to the invention, the following solvents can be stabilized against evaporation: all hydrocarbon solvents of aliphatic or aromatic type, for example, solvent benzine, white spirit, gasoline for cleaning, benzine, benzene, toluene, xylene, furthermore halogenated hydrocarbons such as methylene chloride, trichlorethane, chloroform, carbon tetrachloride, bromoform and iodoform, $\beta,\beta'$-dichlorodiethyl ether, terpen hydrocarbons, tetrahydrofurane, tetrahydropyrane, tetrahydrofurfuryl alcohol, tetrahydronaphthalene, tetraline, as well as mixtures of two or several of these solvents with one another, or with small amounts of other solvents, for example, higher alcohols, or even with water.

The evaporation inhibitors of the present invention are employed in amounts ranging from about 0.1 to 10% by weight, calculated on the solvent, mixture of solvents or system of solvents. By varying the monobasic acid component, the alcohol component and/or the modifying polybasic acid optimum protection is obtained, the dosage of this inhibitor depending on the character of the system of liquids to be stabilized with regard to evaporation and by the degree of stability desired.

The evaporation inhibitors of the present invention have the considerable advantage that they do not materially affect the coloration, viscosity, spreading property, lubricity, etc. of the systems to be stabilized. This is especially true for the evaporation stabilization of solvent systems which consist of one or several solvents and binders dissolved in them. By way of example, the system may include solid hydrocarbons, hard paraffins, soft paraffins, ozocerite, crude or oxydized montan wax, stearin, ceresin, esters and salts of montan waxes, ketones of higher fatty acids, polyethylene, polypropylene, polybutylene, polyvinyl chloride, polyvinylidene chloride, polyvinyl acetate, polyvinyl butyrate, polymers based on acrylic acid esters or metacrylic acid esters, polyacrylonitrile, polyesters, polyamides, polyester amides, alkyd resins and glyptal resins, synthetic and natural rubbers, natural resins, and which may also contain solid fillers and pigments in dispersed form. The systems to be stabilized against evaporation may be either thinly liquid, thickly liquid or highly viscous, ointment-like or pasty. In each case, it is of utmost importance that the system being stabilized be thoroughly mixed with the evaporation stabilizer. The method of adding the additive is irrelevant. The evaporation inhibitors may also be admixed with one of the components of the system, for example, with the solvent, the mixture of solvents or with the binder or filler prior to forming the solvent system to be stabilized against evaporation, if this is of advantage with regard to mixing. If necessary, admixing of the inhibitors can also be promoted by heating the whole system to be stabilized.

The solvent systems containing a binder and one evaporation inhibitor of the invention are surprisingly distinguished by the fact that thin layers thereof dry on and through and glaze after hardening in practically the same manner and degree as coatings produced with addition of a stabilizer.

Therefore, the inhibitors of the present invention can be used for many applications. In particular there are mentioned, the industry of solvents, the industry of lacquers and varnishes, the industry of solvent-containing cleansing agents, cleaners and polishing agents, cosmetic lacquers, shoe-creams, floor-wax and generally the products of the wax goods industry.

The date of the test series given in the following table show the effect of the inhibitors of the present invention.

All tests showed a considerable decrease in the tendency of the solvents in all states to evaporate. In fact, tests 10 and 11 show that in some systems it is possible to completely prevent evaporation.

The action mechanism of the evaporation stabilizers of the invention is not yet fully understood. It is believed that the inhibitor dissolved in the system forms a thin monomolecular layer on the free surface of the system which is partly destroyed on withdrawal of one part of the content of the container, but which then regenerates from the evaporation stabilizer still dissolved in the system to again form effective protection against evaporation.

The following example illustrates the invention, but it is not intended to limit it thereto:

EXAMPLE 12.0% by weight of a partially esterified, partially saponified crude montan wax oxidized with chromic acid (flowing point/dropping point 99/100° C., acid number 17, saponification number 92), 1.0% by weight of an ozocerite (solidification point 72° C.) and 12.0% by weight of a fully refined paraffin (solidification point 50/52° C.) are molten at 105–110° C., while slowly stirring. As soon as the melt is homogeneous, it is diluted with 26.0% by weight of spirit of turpentine and 36.0% by weight of white spirit and mixed with a solution of 3% by weight of nigrosine base degradation product (nigrosine bases degradated with oleine in a ratio of 1:2), in 10.0% by weight of spirit of turpentine. The mass is allowed to cool to 50° C. and is then filled as usual in cans and allowed to solidify. This black shoe-cream loses, when allowed to stand open at room temperature of 20° C. and a relative air moisture of 50%, in 3 weeks 30% of its content of solvent.

When, during the preparation of the shoe-cream, 0.5% by weight of a condensation product of diglycerin and stearic acid, preponderantly containing diaglycerin-monostearate and further esterified with adipic acid, is added to the molten wax mass, the solvent loss under the same condition is reduced to 15%.

When using as an evaporation inhibitor the same amount of an esterification product of diglycerin and stearic acid and oxystearic acid, the solvent loss is reduced to 12%.

When using as an evaporation inhibitor the same amount of a condensation product of diglycerin and stearic acid, preponderantly containing diglycerin-mono-

TABLE

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Paraffin | 5 | | | 5 | | | 5 | | | | | | | | |
| Test Product A | | 5 | | | 5 | | | 5 | | 5 | 5 | | | | |
| Test Product B | | | 5 | | | 5 | | | 5 | | | | | | |
| Test benzine | 45 | 45 | 45 | | | | | | | | | 50 | | | |
| Xylene | | | | 45 | 45 | 45 | | | | | | | 50 | | |
| Spirit of turpentine | | | | | | | 45 | 45 | 45 | | | | | 50 | |
| β'β-dichlorodiethylether | | | | | | | | | | 45 | 45 | | | | 50 |
| Appearance | Sol. | Sol.+sed. | Paste | Sol. | Sol. | Sol.+sed. | Sol. | Sol. | Oil | Paste | Paste | | | | |
| Loss in percent after 24 hours | 80 | 20 | 11 | 82 | 70 | 7.8 | 70 | 7.6 | 54 | 0 | 0 | 100 | 100 | 93 | 25 |
| Loss in percent after 48 hours | 82 | 38 | 22 | 85 | 78 | 16 | 80 | 17 | 74 | 0.2 | 0.4 | | | 97 | 42 |

The loss of pure solvent caused by evaporation at room temperature was compared with that of solutions of 10% strength of paraffin (softening point about 50° C.) and with two evaporation inhibitors A and B in the same solvents, on standing in open crystallization dishes having a diameter of 75 mm.

The evaporation inhibitor A used was a diglycerin-monostearate, modified by phthalic acid anhydride incorporated by condensation. The evaporation inhibitor B used was a mixed partial ester of stearic acid and a mixture of higher molecular fatty acids (montan wax, oxidized) with diglycerin.

stearate and further esterified with phthalic acid, the solvent loss is only about 9%.

All other properties of the shoe-cream such as consistency, surface reflex, hardness of the wax film and luster remain the same, even when adding the two last-mentioned evaporation stabilizers. Although diglycerin-monostearate affects somewhat the surface reflex, the usefulness of the shoe-cream is not lessened.

We claim:

1. The process for retarding the evaporation of an organic liquid, which comprises adding to the organic liquid an evaporation inhibiting amount of a substance selected from the group consisting of a partial ester of a polyhydric ether alcohol with a monobasic fatty acid having at least 8 carbon atoms and containing free hydroxy groups, and a partial ester of a polyhydric ether alcohol with a monobasic hydroxy fatty acid having at least 8 carbon atoms and containing free hydroxy groups.

2. The process as claimed in claim 1, in which the partial ester contains a member of the group consisting of a polybasic acid incorporated by condensation and an anhydride of a polybasic acid incorporated by condensation.

3. A process as claimed in claim 1, wherein the partial ester is diglycerin-monostearate modified by phthalic acid anhydride incorporated by condensation.

4. A process as claimed in claim 1, wherein a partial ester of diglycerin with stearic acid and a mixture of higher fatty acids, produced by oxidation of montan wax, is used as the partial ester.

References Cited
UNITED STATES PATENTS

| | | | |
|---|---|---|---|
| 2,427,255 | 9/1947 | Burrell et al. | 106—3 X |
| 2,523,281 | 9/1950 | Currie | 106—3 |
| 2,776,268 | 1/1957 | Morrill | 106—10 X |
| 2,782,124 | 2/1957 | Von Rosenberg et al. | 106—10 |
| 3,257,162 | 6/1966 | Cox | 21—60.5 |

MORRIS O. WOLK, *Primary Examiner.*

R. E. SERWIN, *Assistant Examiner.*